(12) United States Patent
Carmon et al.

(10) Patent No.: US 8,306,527 B2
(45) Date of Patent: Nov. 6, 2012

(54) FEMTOCELL HANDSET ASSISTED CLOCK CORRECTION (75) Inventors: Rafy Carmon, Rishon-Le'tzion (IL); Yoav Volloch, Kfar-Saba (IL); Amir Appel, Kfar-Saba (IL); Sharon Levy, Hadera (IL)

(73) Assignee: Percello Ltd., Raanana (IL)

( * ) Notice: Subject to any disclaimer, the term of this patent is extended or adjusted under 35 U.S.C. 154(b) by 115 days.

(21) Appl. No.: 12/765,197

(22) Filed: Apr. 22, 2010

(65) Prior Publication Data
US 2010/0273474 A1 Oct. 28, 2010

(30) Foreign Application Priority Data
Apr. 23, 2009 (GB) .................................. 0906990.7

(51) Int. Cl.
*H04W 24/00* (2009.01)
(52) U.S. Cl. ... 455/424; 455/13.2; 455/63.1; 455/67.13; 455/422.1; 455/501; 370/310; 370/310.2; 370/324; 370/326
(58) Field of Classification Search ............... 455/422.1, 455/424, 13.2, 501, 502, 63.1, 67.13; 370/310, 370/310.2, 324, 338
See application file for complete search history.

(56) References Cited

U.S. PATENT DOCUMENTS

| 5,471,648 | A | * | 11/1995 | Gourgue | 455/63.1 |
| 5,613,193 | A | * | 3/1997 | Ishikawa et al. | 455/12.1 |
| 5,826,197 | A | * | 10/1998 | Nagata et al. | 455/524 |
| 5,872,774 | A | * | 2/1999 | Wheatley et al. | 370/335 |
| 5,914,981 | A | * | 6/1999 | Veintimilla | 375/145 |
| 6,208,871 | B1 | * | 3/2001 | Hall et al. | 455/517 |
| 6,856,611 | B2 | * | 2/2005 | Chaudhuri et al. | 370/335 |
| 7,813,311 | B2 | * | 10/2010 | Dick et al. | 370/324 |
| 2010/0216408 | A1 | * | 8/2010 | Carter et al. | 455/67.11 |

FOREIGN PATENT DOCUMENTS

| EP | 0719063 | 6/1996 |
| GB | 2441375 | 3/2008 |
| JP | 02164140 | 6/1990 |
| WO | WO 99/44306 | 9/1999 |

OTHER PUBLICATIONS

Combined Search and Examination Report for GB patent application No. 0906990.7 issued on Jul. 1, 2009.

* cited by examiner

*Primary Examiner* — Steve D Agosta
(74) *Attorney, Agent, or Firm* — Sterne, Kessler, Goldstein & Fox, PLLC (57) ABSTRACT A method of improving frequency accuracy of a clock unit adapted to clock a femtocell local cellular communication home base station is provided. The method comprising: providing a local cellular communication home base station having an oscillator adapted to operate as a clock therein, wherein at least one cellular communication device is camped thereto, and wherein the at least one camped cellular communication device is further in communication with at least one neighboring cellular communication base station which is associated with an oscillator adapted to operate as a clock therein; periodically applying a derivative operator over periodically obtained local communication parameters and periodically obtained neighboring communication parameters thereby generating derivative communication parameters over time; and correcting the accuracy of the frequency of the clock in the femtocell local cellular communication home base station using the derivative communication parameters over time.

15 Claims, 3 Drawing Sheets

FEMTOCELL HANDSET ASSISTED CLOCK CORRECTION

CROSS REFERENCE TO RELATED APPLICATIONS

This application claims the benefit of UK Patent Application GB 0906990.7 filed on Apr. 23, 2009 which is incorporated herein by reference.

BACKGROUND

1. Technical Field

The present invention relates to the field of cellular communication networks, and more particularly, to cellular communication base stations.

2. Related Art

Prior to setting forth the background of the related art, it may be helpful to set forth definitions of certain terms that will be used hereinafter.

The term "cellular communication network" as used herein in this application, is defined as any radio frequency (RF) based communication network that is based upon geographical partition of space into cells. Each cell is provided with at least one base station that manages the wireless communication therein. Various cellular communication standards are currently in use while other are being developed. The popular ones are: UMTS, HSPA, GSM, CDMA-2000, TD-SCDMA, LTE and WiMAX.

The term "Universal Mobile Telecommunications System" or "UMTS" as used herein in this application, is one of the third-generation (3G) cell phone technologies, which is also being developed through HSPA into a 4G technology. Currently, the most common form of UMTS uses Wideband Code Division Multiple Access (W-CDMA) as the underlying air interface. W-CDMA is a wideband spread-spectrum mobile air interface that utilizes the direct-sequence spread spectrum method of asynchronous code division multiple access to achieve higher speeds and support more users compared to the implementation of time division multiplexing (TDMA) used by 2G GSM networks.

The term "Femtocell" or "Home Base Station" or "Home Node B" as used herein in this application, is the industry term for a small cellular communication base station, typically designed for use in residential, enterprise or small business environments. The femtocell connects to the service provider's network via broadband Ethernet connection (such as DSL or cable). Current designs typically support two to eight mobile phones simultaneously in a residential setting. A femtocell allows service providers to extend service coverage and capacity indoors, especially where access would otherwise be limited or unavailable. Femtocells provide cellular coverage in a limited area, usually up to few tens or hundreds of meters. The femtocell incorporates the functionality of a typical base station but extends it to allow a simpler, self contained deployment. By way of example, a UMTS femtocell may contain a Node B and RNC with Ethernet connection for backhaul. Femtocells may use different communication standards, including UMTS, HSPA, GSM, CDMA-2000, TD-SCDMA, LTE and WiMAX. In a particular case, the 3G femtocell includes the functionality of the traditional Node-B and RNC, while using the standard 3G/HSPA interface to communicate with the cellular handsets and the internet broadband access for backhauling to the mobile operator.

The femtocells advantages to the operators and to the end user have been much discussed in the public domain. In one aspect of femtocells deployment is the capability of the mobile operator to completely substitute the traditional wire-line operator, while convincing the end user to completely switch to cellular handset, i.e. all indoor voice and data communication shall be done using mobile handsets.

One of the femtocell challenges is the requirement for a very low cost solution, suitable for deployment in consumer (residential or SoHo) markets. Nonetheless, in contrast to macrocells, where the BOM cost sensitivity is relatively low, the femtocells cannot use an expensive high frequency oscillators or deriving the clock from backhaul accurate links (e.g. E1/T1). Therefore, to meet this low cost BOM goal, femtocells must use low cost clock sources, such as +/−2 ppm (part per million) TCXO or VCXO oscillators. Nevertheless, the femtocells are base stations, and as such they serve as time and frequency master/references for the handsets camping on them. Accordingly, the femtocells are still required to meet strict frequency accuracy requirements as specified by the different standard or regulatory bodies. For example, 3G femtocells need to have an accuracy of 0.1 ppm, as required, for example, by the standards set by 3rd Generation Partnership Project (3GPP) release 99 through release 7, or 0.25 ppm as required by releases 8 and 9 of the 3GPP.

Due to the aforementioned constraints, the femtocells are required to use other schemes for clock/frequency accuracy, while maintaining the femtocell overall cost low. Several methods have been adopted for frequency correction in femtocells using low cost clock sources: Macrocell sniffing, using Ethernet Time servers with internet clock synchronization protocols, and using of medium cost/medium accuracy oscillator for clocking, for example: TCXO, VCXO, and OCXO.

Several methods have been adopted for frequency correction in femtocells using low cost clock sources: Macrocell sniffing—The femtocells are equipped with the functionality of receiving the downlink channels of high accurate macrocells. The technique consists of periodical receive of the macrocell downlink (e.g. 2G or 3G downlink synchronization and broadcast channels), deriving the frequency and timing from these channels and correcting the femtocell local TCXO/VCXOs. The disadvantages of this technique are: an additional receiver path (the femtos need to receive both uplink and downlink channels over different bands), cost increase and the condition that the femto will be under macrocell coverage. This technique fails in the scenarios of macrocell poor indoor coverage where the femto cannot receive any macrocells downlink channel. In addition, this technique can be used only through the periods where femtocell is not involved in any call—in other words the femto cannot make freq/clock corrections as long as it is involved in any dedicated call; Use Ethernet Time servers with internet clock synchronization protocols, such as IEEE 1588 PTP or NTP. The disadvantage of this technique is the dependency on availability of close internet Grandmasters Time servers, additional load of these protocols on the backhaul internet link and additional hardware in the femtocell for PTP/NTP packets time stamping.

In the case of use of medium cost/medium accuracy—one or multiple TCXO/VCXO/OCXO in combination with the techniques above. In the case of Macrocell sniffing—The femtocells are equipped with the functionality of receiving the downlink channels of high accurate macrocells. The technique consists of periodical receive of the macrocell downlink (e.g. 2G or 3G downlink synchronization and broadcast channels), deriving the frequency and timing from these channels and correcting the femtocell local TCXO/VCXOs. The disadvantages of this technique are: an additional receiver path (the femtocells need to receive both uplink and downlink channels over different bands), cost increase and the condition that the femtocell will be under macrocell coverage. This technique fails in the scenarios of macrocell poor indoor coverage where the femtocell cannot receive any macrocells downlink channel. In addition, this technique can be used only through the periods where femtocell is not involved in any call—in other words the femtocell cannot make freq/clock corrections as long as it is involved in any dedicated call Using Ethernet Time servers with internet clock synchronization protocols, like IEEE 1588 PTP or NTP. The disadvantage of this technique is the dependency on availability of close internet Grandmasters Time servers, additional load of these protocols on the backhaul internet link and additional ardware in the femtocell for PTP/NTP packets timestamping.

BRIEF SUMMARY

Embodiments of the present invention provide a method of improving frequency accuracy of an oscillator generating a clock signal exhibiting a frequency and adapted to clock a local cellular communication home base station, the method comprising: providing a local cellular communication home base station having an oscillator adapted to operate as a clock therein, wherein at least one cellular communication device is camped thereto, and wherein the at least one camped cellular communication device is further in communication with at least one neighboring cellular communication base station which is associated with an oscillator adapted to operate as a clock therein; periodically obtaining, from the at least one camped cellular communication device, neighboring communication parameters corresponding with the communication between the at least one cellular communication device and the at least one neighboring cellular communication base station; periodically obtaining, from the at least one camped cellular communication device, local communication parameters corresponding with the communication between the at least one cellular communication device and the local cellular communication home base station; periodically applying a derivative operator over the local communication parameters and the neighboring communication parameters thereby generating derivative communication parameters over time; and correcting the accuracy of the frequency of the oscillator adapted to operate as a clock in the local cellular communication home base station using the derivative communication parameters over time.

Embodiments of the present invention further provide a cellular communication local base station that comprises: a processor; a storage unit and; an RF unit; and a clock. The processor, the storage unit and, the RF unit and the clock are adapted to, in cooperation, to enable communication between at least one cellular communication device camped to the local base station and at least one cellular communication device camped to a neighboring cellular communication base station that may be connected to the local base station via a networked connection. In addition, clock is further adapted to generate a clock signal exhibiting a frequency for clocking the local base station.

In operation, the processor is further adapted to: periodically obtain, from the at least one camped cellular communication device, neighboring communication parameters corresponding with the communication between the at least one cellular communication device and the at least one neighboring cellular communication base station; periodically obtain, from the at least one camped cellular communication device, local communication parameters corresponding with the communication between the at least one cellular communication device and the local cellular communication home base station; periodically apply a derivative operator over the local communication parameters and the neighboring communication parameters thereby generating derivative communication parameters over time; and correct the accuracy of the frequency of the oscillator adapted to operate as a clock in the local cellular communication home base station using the derivative communication parameters over time.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
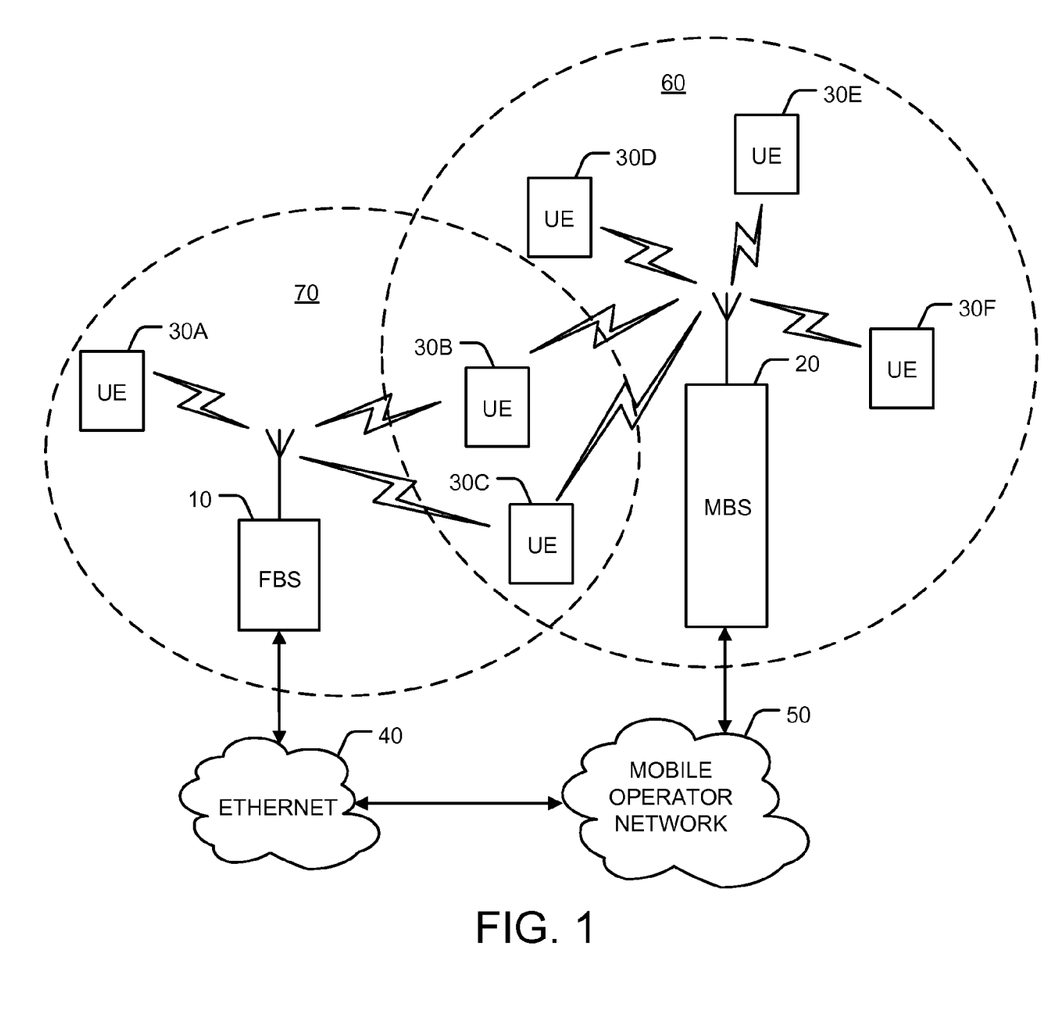
FIG. 1 is a high level block diagram illustrating a cellular communication network according to some embodiment of the present invention.

FIG. 1 is a high level block diagram illustrating a cellular communication network according to some embodiment of the present invention. The cellular communication network comprises a cellular communication local base station 10, of a femtocell base station (FBS) type. A plurality of cellular communication devices 30A, 30B, and 30C, also known as user equipment (UE) are camped, within cellular cell 70 to local base station 10. The cellular network further comprises at least one neighboring cellular base station 20 that is of a macrocell base station (MBS) type. A plurality of cellular communication devices 30D, 30E, and 30F are camped to neighboring macrocell base station 20, while other cellular communication devices 30A, 30B, and 30C, are merely in communication with cellular base station 20 but camped, as noted above, to local base station 10. Local femtocell base station 10 is connected to at least one macrocell base station 20 via an Ethernet network 40 and a mobile operator network 50.

In operation, local femtocell base station 10 enables communication between at least one cellular communication device 30A, 30B, and 30C camped to local base station 10 and at least one cellular communication device 30D, 30E, and 30F camped to neighboring cellular communication base station 20.

Local femtocell base station 10 is equipped with a clock that is adapted to generate a clock signal exhibiting a frequency for clocking local base station 10. Due to cost limitation, the aforementioned clock exhibits frequency accuracy that is substantially lower than the frequency accuracy of the clocks used in macrocells such as macrocell base station 20.

Thus, according to some embodiments of the invention, local femtocell base station 10 adapted to: periodically obtain, from the at least one camped cellular communication device 30B, and 30C, neighboring communication parameters corresponding with the communication between the at least one cellular communication device 30B, and 30C and the at least one neighboring cellular communication base station 20; periodically obtain, from the at least one camped cellular communication device 30B, and 30C, local communication parameters corresponding with the communication between the at least one cellular communication device 30B, and 30C and the local cellular communication home base station 10; periodically apply a derivative operator over the local communication parameters and the neighboring communication parameters thereby generating derivative communication parameters over time; and correct the accuracy of the frequency of the oscillator adapted to operate as a clock in the local cellular communication home base station 10 using the derivative communication parameters over time.

According to some embodiments of the invention, at least one neighboring base station is in operative association with a clock (not shown) exhibiting frequency accuracy substantially higher than the clock associated with the local base station.

According to some embodiments of the invention, the neighboring communication parameters correspond with the frequency associated with the oscillator (not shown) of the at least one neighboring base station 20 and wherein the local communication parameters correspond with the frequency associated with the oscillator of the local base station 10.

According to some embodiments of the invention, the neighboring communication parameters correspond with the quantitative measurements indicative of the strength of the RF signal. These quantitative measurements may comprise, for example: received signal strength indication (RSSI), Received Signal Code Power, (RSCP), and the ratio of received pilot energy, Ec, to total received energy or the total power spectral density Io (Ec/Io), associated with the at least one neighboring base station 20 and wherein the local communication parameters correspond with the RSSI, RSCP, or Ec/associated with the local base station 10.

According to some embodiments of the invention, local base station 10 may be further arranged to perform a frequency scan over at least one neighboring base station 20 in order to detect the clock frequency thereof. Specifically, local base station 10 is arranged to perform the frequency scan by increasing and decreasing (or vice versa) the clock frequency around a predefined value. Additionally, cellular communication devices 30B and 30C that are camped to local base station 10 (thus following it's clock frequency) are arranged to measure the strength of the RF signal from at least one neighboring base station 20, e.g. by measuring the RSSI, RSCP, or Ec/Io value. Thus, the clock frequency of neighboring base station 20 is determined as the frequency associated with the maximal measured RSSI, RSCP, or Ec/Io.

Advantageously, the aforementioned frequency scan may be efficiently implemented since the cellular communication device is camped on the local base station 10 therefore the expected RSSI, RSCP, or Ec/Io measurements of the neighboring base station depend on the frequency offset between the local base station 10 and the neighboring base station 20. Thus, the local base station will be able to obtain a Gaussian representation of the RSSI, RSCP, or Ec/Io results as dependent on the clock's oscillator position. The oscillator's value, for which the RSSI, RSCP, or Ec/Io value is at its max (Gaussian center), is the point where the local base station frequency is identical to the neighboring base station frequency. In consequence, the local base station will be able to adjust the clock source (VCXO for example) to the correct point. Continuous operation and further filtering will enable convergence of the clock source accuracy of the local base station to the neighboring base station's accuracy.

According to some embodiments of the invention, the neighboring communication parameters correspond with CFN Connection Frame Number (CFN) and System Frame Number (SFN) associated with the at least one neighboring base station 20 and wherein the local communication parameters correspond with the CFN and the SFN associated with the local base station 10.

More specifically, the local base station will instruct at least one camped cellular communication device to perform and periodically report the SFN-SFN/CFN-SFN time difference measurements towards each of the neighboring base station that are in communication therewith. Preferably, but not exclusively, the reporting rate will be moderate (e.g., once per several seconds), good enough for the local base station to precisely derive the drift rate per time of this measurement. Thus, the local base station will calculate the derivative of the time difference (SFN-SFN). The result will be filtered and combined with the previous results and the results of the other neighboring base station. The weighted result will serve as the adjustment required to the local base station clock source (e.g., TCXO or VCXO).

Advantageously, continuous operation of this process will converge the TCXO to the accuracy of the neighboring base station. By way of example only, if a particular local base station's VCXO offset is 0.5 ppm as compared to the neighboring base station, the SFN-SFN reports will continuously change by approximately 2 chips/sec. Thus, 20 sec after significant retaining this drift, the local base station will be highly confident its VCXO is causing a 2 chip/sec drift and therefore correct adjust the VCXO by 0.5 ppm.

Figure 2:
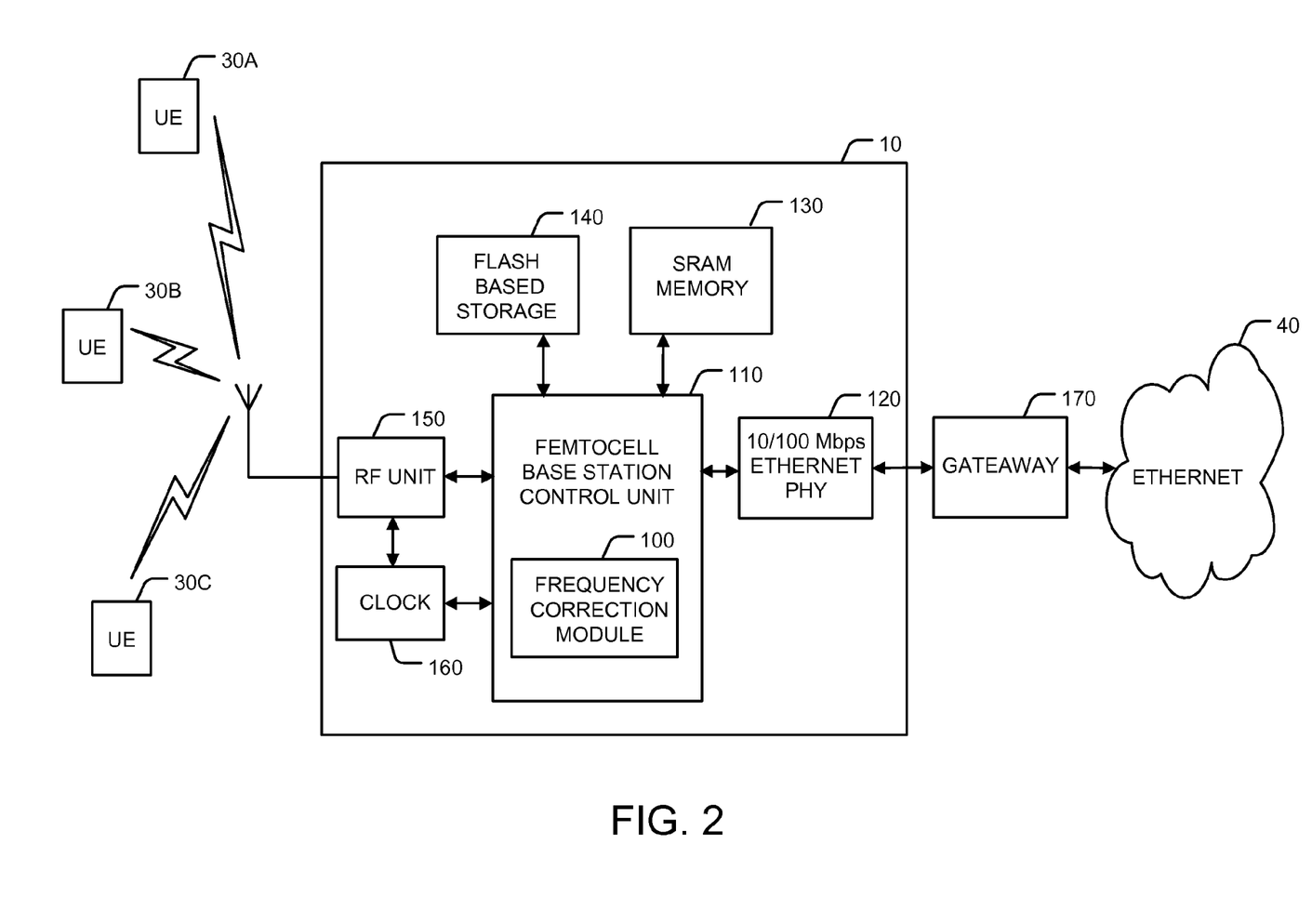
FIG. 2 is a high level block diagram illustrating a cellular communication local base station according to some embodiments of the present invention.

FIG. 2 is a high level block diagram illustrating a cellular communication local base station 10 according to some embodiments of the present invention. Cellular communication local base station 10 comprises: a processor (femtocell base station control unit) 110; a storage unit 130 and 140; an RF unit 150; and a clock 160. The processor 110, the storage unit 130 and 140, the RF unit 150 and the clock 160 are adapted to, in cooperation, to enable communication between at least one cellular communication device 30B camped to the local base station 10 and at least one cellular communication device 30F camped to a neighboring cellular communication base station 20 that is connected to the local base station 10 via a networked connection 40 and 50. In addition, clock 160 is further adapted to generate a clock signal exhibiting a particular frequency for clocking local base station 10, and specifically processor 110 and RF unit 150, thus controlling both the timing and RF frequency of local base station 10.

In operation, processor 110 is further adapted to: periodically obtain, from the at least one camped cellular communication device 30B, neighboring communication parameters characterizing the communication between the at least one cellular communication device 30B and the at least one neighboring cellular communication base station (not shown); periodically obtain, from the at least one camped cellular communication device 30B, local communication parameters corresponding with the communication between the at least one cellular communication device 30B and the local cellular communication home base station 10; periodically apply a derivative operator over the local communication parameters and the neighboring communication parameters thereby generating derivative communication parameters over time; and correct the accuracy of the frequency of clock 160 incorporated in local cellular communication home base station 10 using the derivative communication parameters over time.

According to some embodiments of the invention, at least one neighboring base station (not shown) is in operative association with a clock exhibiting frequency accuracy substantially higher than clock 160 associated with local base station 10.

According to some embodiments of the invention, the neighboring communication parameters may correspond with the frequency associated with the oscillator (clock) of the at least one neighboring base station and wherein the local communication parameters correspond with the frequency associated with clock 160 of local base station 10.

Figure 3:
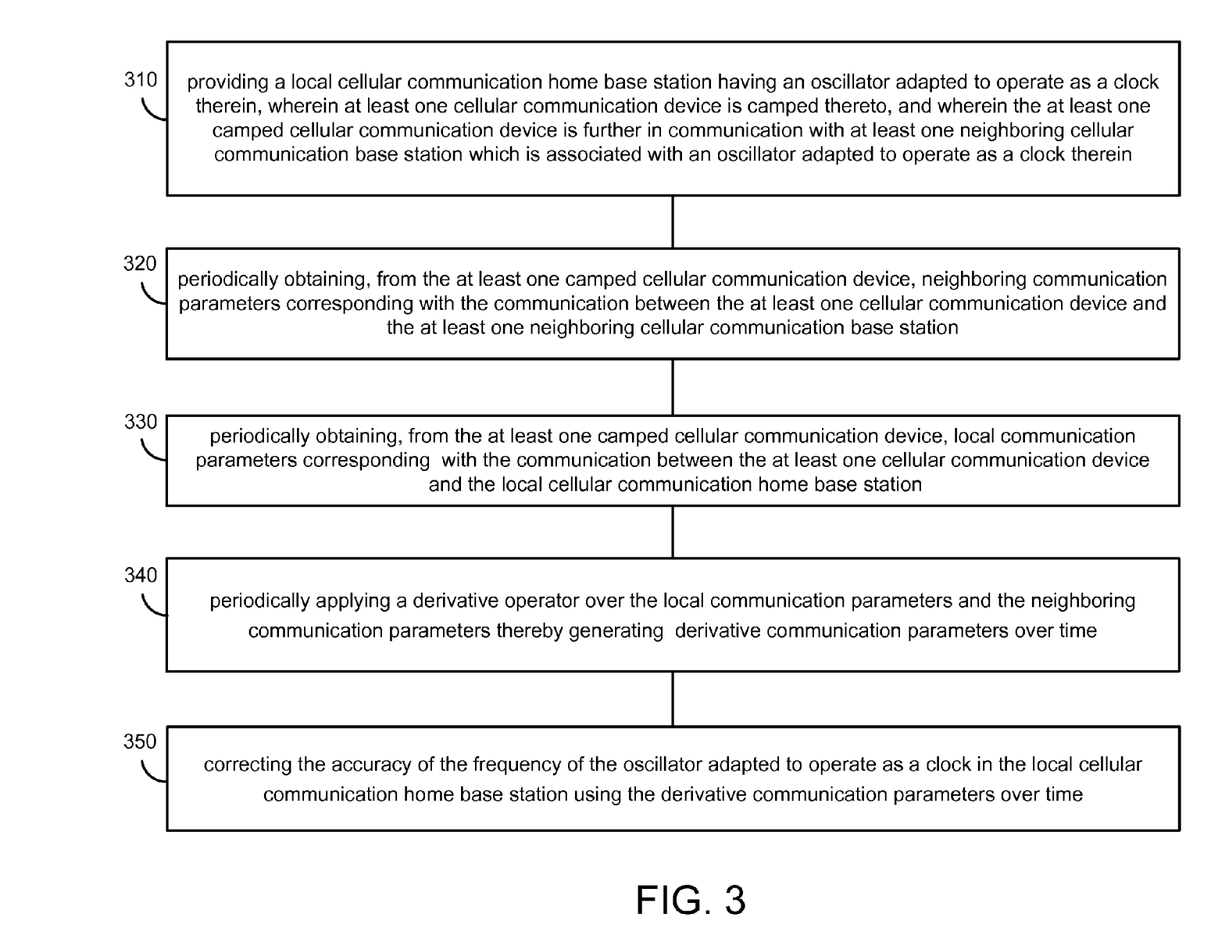
FIG. 3 is a high level flowchart illustrating a method according to some embodiments of the present invention.

FIG. 3 is a high level flowchart illustrating a method according to some embodiments of the present invention. The flowchart shows a method of improving frequency accuracy of an oscillator generating a clock signal exhibiting a particular frequency and adapted to clock a local cellular communication home base station. The method comprising: providing a local cellular communication home base station having an oscillator adapted to operate as a clock therein, wherein at least one cellular communication device is camped thereto, and wherein the at least one camped cellular communication device is further in communication with at least one neighboring cellular communication base station which is associated with an oscillator adapted to operate as a clock therein 310; periodically obtaining, from the at least one camped cellular communication device, neighboring communication parameters corresponding with the communication between the at least one cellular communication device and the at least one neighboring cellular communication base station 320; periodically obtaining, possibly but not exclusively, from the at least one camped cellular communication device, local communication parameters corresponding with the communication between the at least one cellular communication device and the local cellular communication home base station 330; periodically applying a derivative operator over the local communication parameters and the neighboring communication parameters thereby generating over time derivative communication parameters 340; and correcting the accuracy of the frequency of the oscillator adapted to operate as a clock in the local cellular communication home base station using the derivative communication parameters 350.

According to some embodiments of the invention, at least one neighboring base station is in operative association with an oscillator (clock) exhibiting a frequency accuracy substantially higher than the oscillator adapted to operate as a clock in the local base station.

According to some embodiments of the invention, the neighboring communication parameters may correspond with the frequency associated with the oscillator of the at least one neighboring base station and the local communication parameters correspond may with the frequency associated with the oscillator of the local base station.

According to some embodiments of the invention, the neighboring communication parameters utilized in the aforementioned method may correspond with the quantitative measurements indicative of the strength of the RF signal. These quantitative measurements may comprise, for example: received signal strength indication (RSSI), Received Signal Code Power, (RSCP), and the ratio of received pilot energy, Ec, to total received energy or the total power spectral density To (Ec/Io), associated with the at least one neighboring base station 20 and wherein the local communication parameters correspond with the RSSI, RSCP, or Ec/associated with the local base station 10.

According to some embodiments of the invention, the neighboring communication parameters utilized in the aforementioned method may alternatively correspond with CFN Connection Frame Number (CFN) and System Frame Number (SFN) associated with the at least one neighboring base station and wherein the local communication parameters correspond with the CFN and SFN associated with the local base station.

Advantageously, embodiments of the present invention make use of the cellular communication devices' measurements capabilities and periodical reports, to enable the local base station (femtocell) to make the appropriate clock/freq corrections in order to converge to the neighboring (macrocell) clock accuracy.

Embodiments of the invention may be applicable for all the scenarios where at least one handset camping on the femtocell is under the coverage of at least one macrocell. It is clearly understood that this is the most typical, general and frequent scenario in the femtocell deployment. However, embodiments of the present invention are not limited to the aforementioned scenario.

Advantageously, embodiments of the present invention implemented in 3G technologies may employ the 3G UMTS standard having defined several neighboring cell measurements such that any cellular communication device (UE) is required to perform. These measurements may comprise: SFN-SFN difference in chip resolution between current cell and each neighboring cell. This measurement is done by the cellular communication device while in IDLE; SFN-CFN difference in chip resolution between current cell and each neighbor cell. This measurement is done by the cellular communication device (UE) while in active call; and RSSI/RSCP/ECIO measurement of each neighboring cell—the cellular communication device should be always able to make it.

These measurements are used in 3G standard and networks to facilitate cell handovers and cellular communication device location services. These measurements can be asked to be performed by the cellular communication device and periodically reported to the base station as instructed by the base station. The reporting period rate is controlled by the base station as well.

According to some embodiments of the invention, the method can be used solely or in combination with the previous art techniques.

Advantageously, the aforementioned method discloses an alternative method for frequency correction for a low cost femtocell system. It is suggested that a femtocell will take advantage of the handsets measurements capabilities as a mean to correct the femtocell clock accuracy. Through use of this technique, the femtocell may be based on a lower but cheaper clock source, while correcting its frequency based on measurements reported by handsets. This technique may be used solely or in combination with previous art frequency correction techniques, for optimal performance in different scenarios while minimizing the cost of the femtocell device.

Advantageously, embodiments of the present invention may be easily implemented in the femtocell software, with very negligible additional resources thereby exhibiting extremely small footprint and additional processing power, while saving expensive hardware such as hardware-implemented sniffer, PTP/NTP timestamping hardware, etc. Therefore we may say it is the most cost effective technique.

Further, embodiments of the present invention may be applicable in a much broader deployment scenario—no dependency on femtocell coverage by macrocells, no dependency on PTP/NTP grandmaster timeservers, and the like.

Further, embodiments of the present invention may be applicable also in the case where the femtocell is involved in active calls.

Advantageously, various embodiments of the invention are aimed for the UMTS femtocells market. However, it is understood that the necessary modification may be performed in order to support any kind of cellular communication, in any standard. Thus, it can similarly be applicable to the LTE, TD-SCDMA, CDMA2000, Wimax and GSM. The technique comprises of the femtocell commanding the handset to periodically report: The 3G system frame number (SFN) frame time differences between any handset neighbor cell and femtocell; and the neighbor cell RSSI/RSCP/ECIO.

According to some embodiments of the invention, the system can be implemented in digital electronic circuitry, or in computer hardware, firmware, software, or in combinations thereof. Preferably, the base band processor with the scalability support functionality is implemented as an application specific integrated circuit (ASIC) thus allowing optimization of the performance while keeping cost relatively low.

Suitable processors modules within the ASIC implementation of the base band processors include, by way of example, digital signal processors (DSPs) but also general purpose microprocessors, and field programmable gate array (FPGA). Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage devices suitable for tangibly embodying computer program instructions and data include all forms of non-volatile memory, including by way of example semiconductor memory devices, such as EPROM, EEPROM, and flash memory devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system comprising:
a first wireless communication base station;
a second wireless communication base station; and
a wireless communication device camped on the first wireless communication base station and in communication with the second wireless communication base station,
wherein the first wireless communication base station is configured to:
conduct a frequency scan by altering a clock frequency of its clock source across a frequency range;
while performing the frequency scan, receive from the wireless communication device signal strength measurements of a signal between the wireless communication device and the second wireless communications base station as a function of a frequency being scanned; and
select a desirable clock frequency for the clock source of the first wireless communication base station, wherein selecting the desirable clock frequency includes generating a Gaussian representation of the signal strength measurements as a function of scanned frequencies and selecting as the desirable clock frequency, a clock frequency in which the signal strength measurement is at a Gaussian center;
receive frame number parameters associated with the second wireless communication base station at a rate that enables the determination of a clock drift rate; and
derive an adjustment to the clock source of the first wireless communications base station and apply the adjustment to the clock source of the first wireless communications base station to converge the accuracy of the clock source of the first wireless communications base station to an accuracy of a clock source of the second wireless communications base station.

2. The system according to claim 1, wherein the first wireless communication base station is a femtocell base station, and the second wireless base station is a macrocell base station.

3. The system according to claim 1, wherein the clock frequency of the first wireless communication base station has a substantially lower accuracy level than a clock frequency of the second wireless communication base station.

4. The system according to claim 1, wherein the received signal strength measurements include one or more of a received signal strength indication (RSSI), a received signal code power (RSCP) or a ratio of received pilot energy to a total received energy.

5. The system according to claim 1, wherein the first and second wireless communication base stations and the wireless communication device communicate utilizing one or more wireless standards comprising:
Code Division Multiple Access (CDMA) -2000;
Global System for Mobile Communications (GSM);
Universal Mobile Telecommunications System (UMTS);
Time Division Synchronous Code Division Multiple Access (TD-SCDMA);
High-Speed Packet Access (HSPA);
Long Term Evolution (LTE); and
Worldwide Interoperability for Microwave Access (WiMAX).

6. A computer program product, comprising a tangible, non-transitory computer-readable medium having computer program code recorded thereon that, when executed by a processor, causes the processor to perform operations, the operations comprising:
conducting a frequency scan by altering a clock frequency of a clock source of a first wireless communication base station across a frequency range;
while performing the frequency scan, receiving from a wireless communication device signal strength measurements of a signal between the wireless communication device and a second wireless communications base station as a function of a frequency being scanned; and
selecting a desirable clock frequency for the clock source of the first wireless communication base station, wherein selecting the desirable clock frequency includes generating a Gaussian representation of the signal strength measurements as a function of scanned frequencies and selecting a as the desirable clock frequency, a clock frequency in which the signal strength measurement is at a Gaussian center;
receiving frame number parameters associated with the second wireless communication base station at a rate that enables the determination of a clock drift rate; and
deriving an adjustment to the clock source of the first wireless communications base station to converge the accuracy of the clock source of the first wireless communications base station to an accuracy of a clock source of the second wireless communications base station.

7. The computer program product according to claim 6, wherein the first wireless communication base station is a femtocell base station and the second wireless communication base station is a macrocell base station.

8. The computer program product according to claim 6, wherein the clock frequency of the first wireless communication base station has a substantially lower accuracy level than a clock frequency of the second wireless communication base station.

9. The computer program product according to claim 6, wherein the received signal strength measurements include one or more of a received signal strength indication (RSSI), a received signal code power (RSCP) or a ratio of received pilot energy to a total received energy.

10. The computer program product according to claim 6, wherein the first and second wireless communication base stations and the wireless communication device communicate utilizing one or more wireless standards comprising:
Code Division Multiple Access (CDMA)-2000;
Global System for Mobile Communications (GSM);
Universal Mobile Telecommunications System (UMTS);
Time Division Synchronous Code Division Multiple Access (TD-SCDMA);
High-Speed Packet Access (HSPA);
Long Term Evolution (LTE); and
Worldwide Interoperability for Microwave Access (WiMAX).

11. A method comprising:
conducting a frequency scan by altering a clock frequency of a clock source of a first wireless communication base station across a frequency range;
while performing the frequency scan, receiving from a wireless communication device signal strength measurements of a signal between the wireless communication device and a second wireless communication base station, as a function of a frequency being scanned; and selecting a desirable clock frequency for the clock source of the first wireless communication base station,
wherein selecting the desirable clock frequency includes generating a Gaussian representation of the signal strength measurements as a function of scanned frequencies and selecting as the desirable clock frequency, a clock frequency, in which the signal strength measurement is at a Gaussian center;
receiving frame number parameters associated with the second wireless communication base station at a rate that enables the determination of a clock drift rate;
deriving an adjustment to the clock source of the first wireless communications base station based on the clock drift rate and applying the adjustment to the clock source of the first wireless communications base station to converge the accuracy of the clock source of the first wireless communications base station to an accuracy of a clock source of the second wireless communications base station,
wherein at least one of the conducting, receiving and determining is executed by a processor.

12. The method according to claim 11, wherein the first wireless communication base station is a femtocell base station and the second wireless communication base station is a macrocell base station.

13. The method according to claim 11, wherein the clock frequency of the first wireless communication base station has a substantially lower accuracy level than a clock frequency of the second wireless communication base station.

14. The method according to claim 11, wherein the received signal strength measurements include one or more of a received signal strength indication (RSSI), a received signal code power (RSCP) or a ratio of received pilot energy to a total received energy.

15. The method according to claim 11, wherein the first and second wireless communication base stations and the wireless communication device communicate utilizing one or more wireless standards comprising:
Code Division Multiple Access (CDMA)-2000;
Global System for Mobile Communications (GSM);
Universal Mobile Telecommunications System (UMTS);
Time Division Synchronous Code Division Multiple Access (TD-SCDMA);
High-Speed Packet Access (HSPA);
Long Term Evolution (LTE); and
Worldwide Interoperability for Microwave Access (WiMAX).

\* \* \* \* \*